July 10, 1956
N. D'URSO
2,754,004
PRESSURE FILTER
Filed April 1, 1953
3 Sheets-Sheet 1
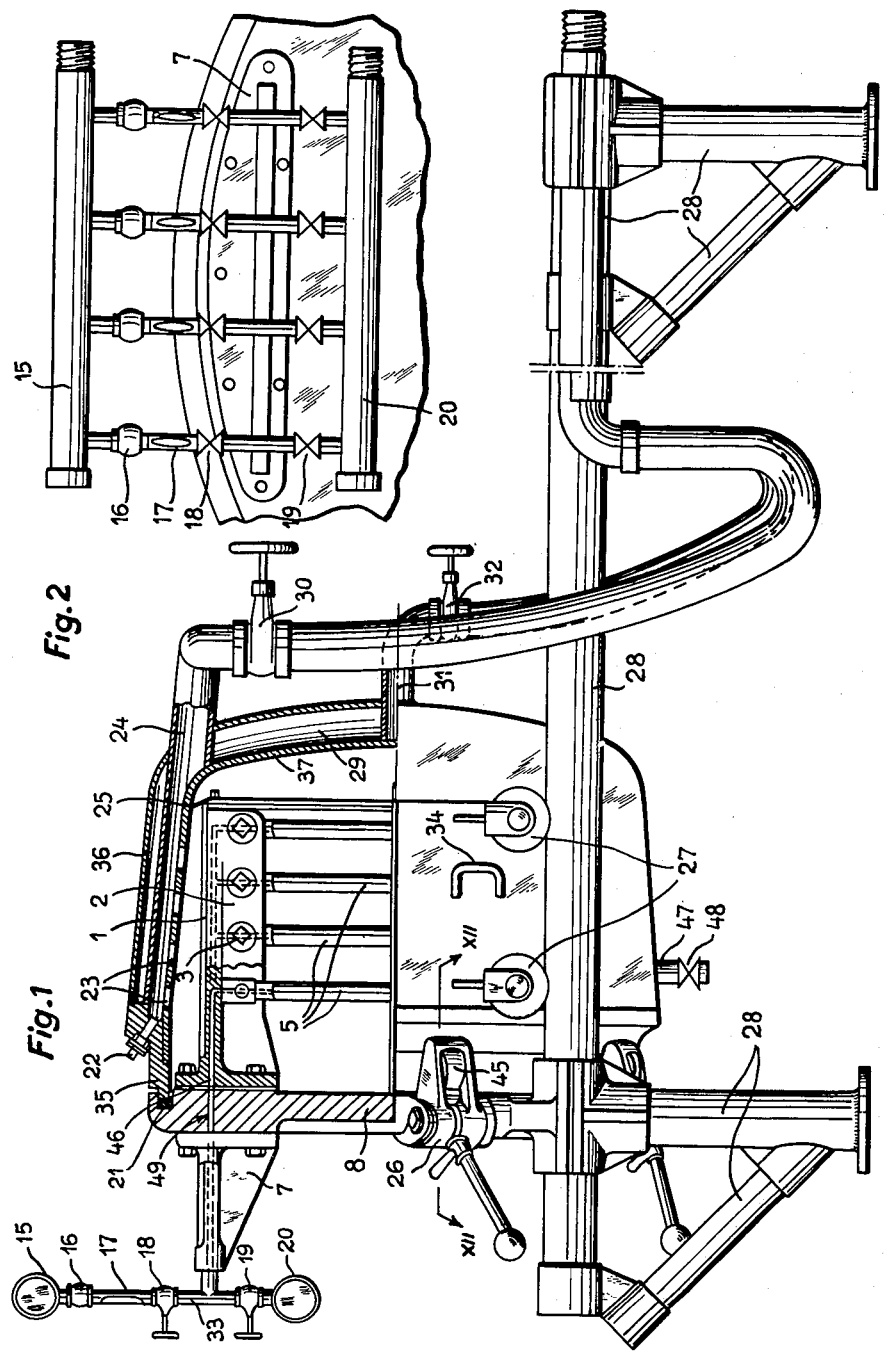

July 10, 1956      N. D'URSO      2,754,004
PRESSURE FILTER
Filed April 1, 1953      3 Sheets-Sheet 2
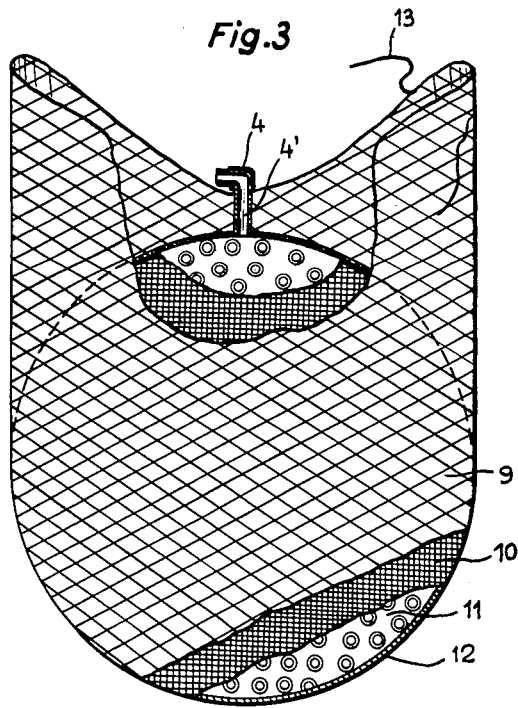
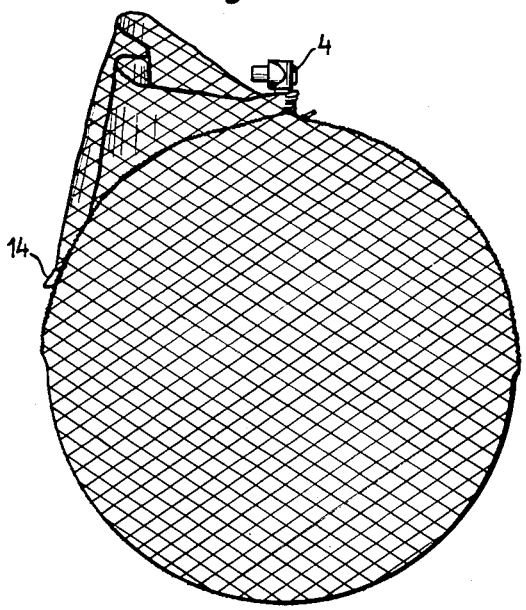
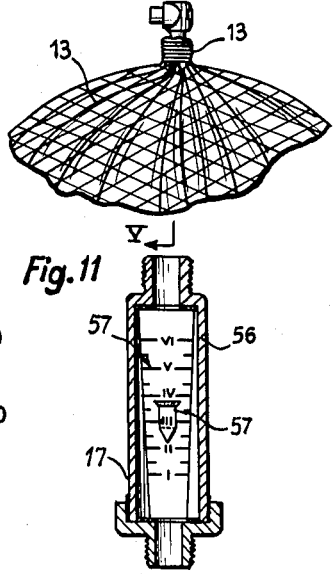
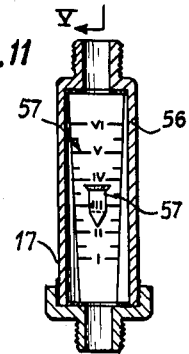
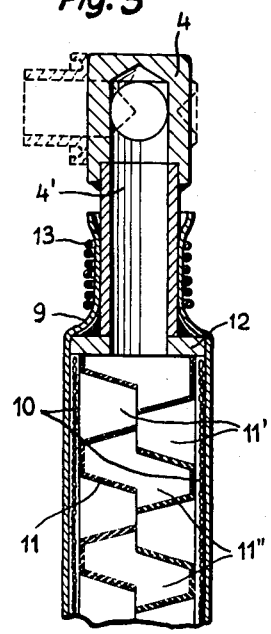

July 10, 1956  N. D'URSO  2,754,004
PRESSURE FILTER
Filed April 1, 1953  3 Sheets-Sheet 3
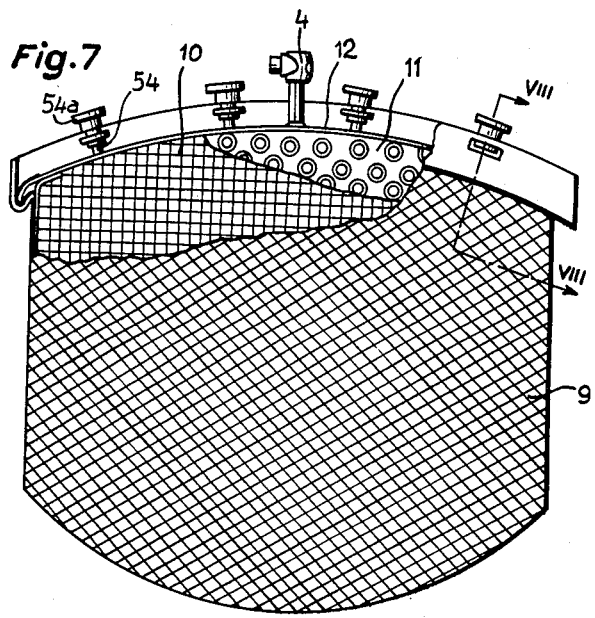
Fig. 7
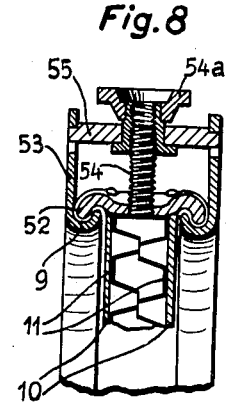
Fig. 8
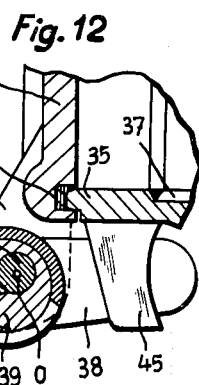
Fig. 12
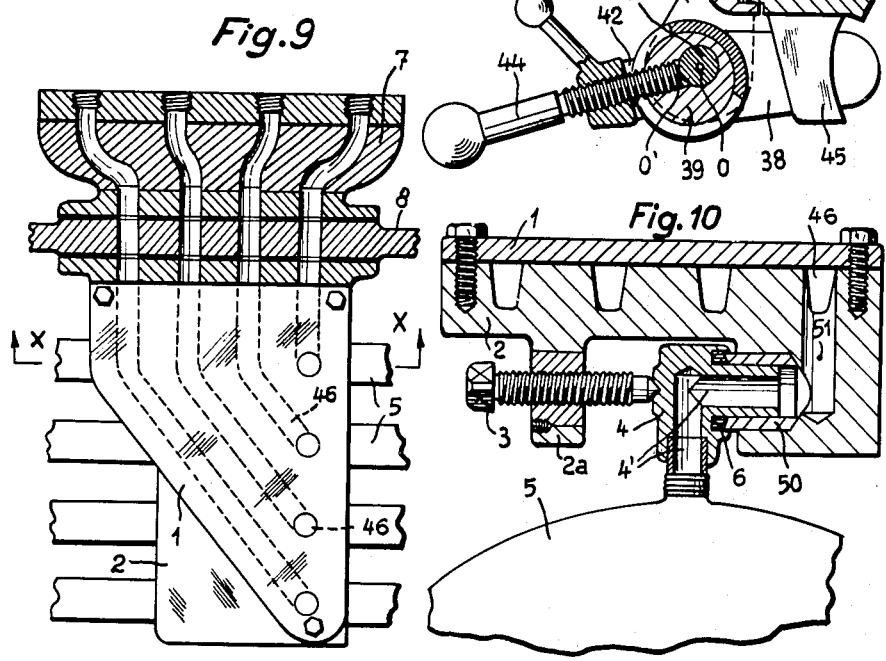
Fig. 9
Fig. 10

United States Patent Office 2,754,004
Patented July 10, 1956

2,754,004

PRESSURE FILTER

Nicola D'Urso, Turin, Italy, assignor, by mesne assignments, to Compagnia Internazionale Superfiltri, Rome, Italy Application April 1, 1953, Serial No. 346,177

Claims priority, application Italy April 3, 1952

1 Claim. (Cl. 210—182)

This invention relates to a pressure filter of the type in which filtering, cleaning or purification is effected in a closed container insulated from the outside and comprising a plurality of filtering elements adapted to retain the impurities contained in the material being treated.

The object of this invention is to provide a pressure filter simple in construction and reliable in working, provided with means permitting a constant and easy checking of operation by the operator.

A further object of this invention is to provide a filter of the type referred to above, provided with means for cutting off part of the filtering elements composing it, when the latter are inoperative or defective and, if necessary, for cleaning them in an easy manner from the outside without disassembling the filter.

A further object of this invention is to provide a filter of a construction such that it can be disassembled in an easy and simple manner and in which the elements are interchangeable for facilitating assembly.

A still further object of this invention is to provide said filter with filtering elements of an improved character and means for adjusting temperature in the enclosure in which filtering takes place.

These and still further objects and advantages of this invention will appear from the appended specification of a construction given by way of example with reference to the accompanying drawings in which:

Figure 1 is a part sectional side view of the filter,

Figure 2 is a part front view of the filter,

Figure 3 is a part sectional view of a filter element as it is being lined with the filtering means.

Figure 4 is a part front view of the same element with the finished lining,

Figure 5 is a section on line V—V of Fig. 4 on an enlarged scale,

Figure 6 is a view of a filter element similar to the element shown in Figure 3, with a modified filtering structure, Figure 7 is a part sectional front view of a modified filter element, Figure 8 is a section on line VIII—VIII of Fig. 7, Figure 9 is a part sectional plan view of a filter detail, Figure 10 is a section on line X—X of Figure 9, Figure 11 is a section of a further constructional filter detail on an enlarged scale, Figure 12 is a section on line XII—XII of Figure 1 on an enlarged scale.

In Figure 1, 28 denotes a frame having attached thereto a head 18 carrying the bracket 2 secured thereto for instance by means of screws. The bracket 2 has suspended thereto the filtering elements 5, each of which communicates with its conduit 46 bored in the bracket 2. Each conduit 46 connects through the hole 49 bored in the head and its respective conduit bored in the bracket 7 with the T-connection 33, and leads through valve 18, inspection glass 17 and check valve 16 into the filtrate collector 15; on the other side the connection 33 leads through valve 19 to the collector 20 for the countercurrent washing fluid. Figure 2 shows the manifolds and valves unit and connections therefor. The manifolds 15 and 20 are arranged transversely of the plane of the head 8, the T-connections 33 with their respective valves 16, 18 and 19 and inspection glasses 17 being arranged in parallel spaced vertical planes. The arrangement of the holes 46 bored in the bracket 2 and connecting with the inside of the filtering elements 5 shall be described in greater detail hereafter. A keir 37, the open end of which has welded thereto a collar 35 carrying the hooks 45, is held to the head 8 by eccentric rings 26, sealing being effected by the packing 21 sunk into the head.

The fluid to be purified reaches the keir through one or more supply tubes 24 through the holes 23 bored in the portions between the filtering elements 5. The plug 22 serves for draining the conduit 24, as and when necessary.

A casing 36 is arranged about the keir, leaving a jacket 29 for the circulation of a hot or cold fluid supplied through the conduit 31 and controlled by valve 32, for heating or cooling the material to be filtered contained in the keir.

The keir 37 and casing 36 are supported by rollers 27. On completion of filtering the unit is released from the retaining eccentric rings 26 and can be easily displaced on the longitudinal members of the frame 28 for removing it from the head 8 by an extent sufficient for uncovering the filtering element 5 and cake formed.

Figures 3, 4, 5, 6 show a filtering element with a circular frame. Each element comprises an annular frame provided at its periphery with a tubular extension 4. The frame supports on both sides plates 11 formed with holes having funnel shaped walls 11' projecting inwardly of the frame, in order to leave continuous zig-zag passages 11'', which connect over the conduit 4' with the tubular extension 4. The plates have superposed thereon grids 10 and paper or cloth or other filtering material of bag shape 9 is placed on the grids. The bag edge is tightened about the neck of the extension 4 and bound by a lace 13 as shown in Figure 4. This type of binding forms at the upper portion of the filtering element ruffles 13' in the filtering cloth, which may be objectionable for certain filtering purposes. In order to obviate this drawback the cloth can be provided with sliding fasteners 14 at the frame edges, as is seen in Fig. 6. The bag edges are turned and fastened to the extension neck, whereupon the fasteners are closed to smooth down the filtering cloth.

A further type of filtering element is shown in Figures 7 and 8. The frame is made up of two vertical lateral sections and two top and bottom arcuated sections and is of the special shape shown in Figure 7. The frame carries plates 11, grids 10 and a cloth bag 9 thereon, the upper bag edges being held between the flange 52 and counter-flange 53 clamped together by screw spindles 54 by means of cross members 55 and nuts 54a screwed on the ends of the spindles 54.

The flange 52 is of one piece with the frame to form the top arcuate portion of the latter and has fixed thereto the extension 4 and spindles 54. The counter-flanges 53 can be disassembled and removed with the bag.

The manner of securing and releasing the bag fabric between the flanges will be clearly understood from Figures 7 and 8. Figure 9 is a plan view showing the conduit bored in the bracket, while Figure 10 shows how each filtering element is suspended to the bracket. More particularly, it will be seen from Figure 10 that the extension 4 is formed by a small tube bent at right angles. An inner hole 4' is bored in the tube and connects the inside thereof through the vertical hole 51 bored in the bracket 2 with the conduit 46 connected in turn with the T-connection 33 (Figure 1). The arrangement is the same in each filtering element. The conduits 46 are covered by the plate 1 which may be removed for cleaning the conduits. The horizontal portion of the extension 4 is rotatably mounted in the bush 50 and held in place by the screw 3 threaded in a rib 2a on the bracket 2, a packing 6 being provided for sealing. With this assembly, the filtering element 5 can oscillate about the axis of the horizontal portion of the extension 4.

Figure 11 shows the structure of the flow meter 17 (Figure 1). The transparent tapered tube 56 within the sheath 17 encloses a member 57, which is a dynamic float of known type. This float is of a specific weight such that it sinks to the bottom of the tube 56 when no liquid from its respective filtering element flows therethrough. Otherwise, it is displaced upwardly by the filtrate stream to indicate by its position the quantity of fluid delivered by the associated filtering element. When the filtrate from one element is turbid, which is a symptom of deterioration of the filtering cloth, said filtering element is cut off from the manifold by closing the gate valve, without stopping operation of the other elements. If the flow meter rises too high and the liquid is turbid, the cloth is obviously torn.

When the flow meter sinks too low, the cloth is apparently choked and the filtering element requires counter-current washing. If all the flow meters are below the average, then the cake formed is thick and coherent and purification will soon be completed.

The closure adopted for locking the keir 37 to the head 8 is shown in Figures 1 and 12. The collar 35 welded to the casing 37 carries hooks 45. The head 8 is provided with pairs of flaps 41 housing the pivot 40. The pivot 40 has mounted thereon an eccentric 39 carrying in turn the U-shaped pull rod 38.

The eccentric 39 is rotated by the rod 44 and locked by the screw-threaded collar 43 by means of the washer 42 on the pull-rod 38. When the eccentric has its eccentricity turned towards the hook 45, the pull-rod is free and can be released from the hook. When the eccentric is moved with its eccentricity in an opposite direction, the pull-rod 38 exerts a traction stress on the hook 45 closing the keir 37 against the head 38. Tight-seal is afforded by a packing 21 fitted in the header 8. The number of closures to be employed varies according to the size of the keir.

The keir is opened as and when necessary, in order to clean, replace or withdraw the filtering elements 5. This generally occurs on completion of the filtering step by releasing the head and removing the keir which is caused to roll on the guides of the frame 38. The filtering elements 5 are thus easily accessible and the deposit thereon can be easily removed from the outside.

It will be understood that the construction described above by way of example can be modified in many respects without departing from the scope of the invention.

What I claim is:

In a pressure filter of the type comprising a frame, a head vertically arranged with respect to the said frame and fixed thereto, a plurality of parallel box shaped flat filtering elements spaced from each other and hinged to a bracket secured at one side of said head to a wall portion thereof, a casing movable along said frame for receiving said filtering elements, said casing communicating with a circuit for supplying the liquid to be filtered and including means for tightly securing said casing to the said head, a bracket arm having the form of a plate detachably secured to the head wall facing the said movable casing, said plate having a plurality of grooves formed in the upper surface thereof, each of said grooves registering at its one end with a bore extending through the head and at its other end with a bore passing through the plate and connected with the inside of a filtering element, a cover plate superposed on the grooved plate and detachably secured thereto, the dimension of the said cover plate being such as to close the grooves from above, whereby these grooves may be easily opened for cleaning and inspection, and an external circuit communicating with the outlets of the bores passing through the head.

References Cited in the file of this patent

UNITED STATES PATENTS

| 928,576 | Anderson | July 20, 1909 |
| 1,015,960 | Kelly | Jan. 30, 1912 |
| 1,244,222 | McCaskell | Oct. 23, 1917 |
| 1,282,280 | Peck | Oct. 22, 1918 |
| 1,377,022 | Naugle | May 3, 1921 |
| 1,965,333 | Connell | July 3, 1934 |